(12) United States Patent
Bao et al.

(10) Patent No.: US 9,319,119 B2
(45) Date of Patent: Apr. 19, 2016

(54) METHOD AND APPARATUS FOR TRANSMITTING AND RECEIVING BEAMFORMING MATRIX

(75) Inventors: Dongshan Bao, Beijing (CN); Shenfa Liu, Beijing (CN)

(73) Assignee: BEIJING NUFRONT MOBILE MULTIMEDIA TECH. CO., LTD., Beijing (CN)

( * ) Notice: Subject to any disclaimer, the term of this patent is extended or adjusted under 35 U.S.C. 154(b) by 0 days.

(21) Appl. No.: 14/376,839

(22) PCT Filed: Mar. 23, 2012

(86) PCT No.: PCT/CN2012/072885
§ 371 (c)(1),
(2), (4) Date: Aug. 5, 2014

(87) PCT Pub. No.: WO2013/117031
PCT Pub. Date: Aug. 15, 2013

(65) Prior Publication Data
US 2014/0355713 A1  Dec. 4, 2014

(30) Foreign Application Priority Data
Feb. 6, 2012  (CN) .......................... 2012 1 0025585
Mar. 2, 2012  (CN) .......................... 2012 1 0052998

(51) Int. Cl.
*H04B 7/02*  (2006.01)
*H04L 1/02*  (2006.01)
*H04B 7/04*  (2006.01)
*H04B 7/06*  (2006.01)

(52) U.S. Cl.
CPC ............ *H04B 7/0456* (2013.01); *H04B 7/0617* (2013.01); *H04B 7/0658* (2013.01); *H04B 7/0663* (2013.01)

(58) Field of Classification Search
CPC .. H04B 7/0639; H04B 7/0417; H04B 7/0452; H04B 7/626; H04B 7/0665
See application file for complete search history.

(56) References Cited

U.S. PATENT DOCUMENTS

| | | | | |
|---|---|---|---|---|
| 2006/0092054 A1* | 5/2006 | Li | ........................ | H04B 7/0417 341/67 |
| 2007/0211823 A1* | 9/2007 | Mazzarese | ........... | H04B 7/0452 375/299 |
| 2009/0252250 A1* | 10/2009 | Heath, Jr. | ............. | H04B 7/0617 375/267 |

OTHER PUBLICATIONS

IEEE Standards Association (IEEE Standards Association "Part11: Wireless LAN Medium Access Control and Physical Layer specifications", revision of 2007, IEEE, total of 2793 pages).*

*Primary Examiner* — Sam K Ahn
*Assistant Examiner* — Fabricio R Murillo Garcia
(74) *Attorney, Agent, or Firm* — Anova Law Group, PLLC

(57) ABSTRACT

The present disclosure provides a method and apparatus for transmitting the beamforming matrix. The method includes calculating the maximum value $m_v(k)$ of the real part and imaginary part of the elements in subcarrier's beamforming matrix; carrying out a M bits quantization to $m_v(k)$ and obtaining the quantization amplitude $M_v(k)$, calculating the linear part $M_v^{lin}(k)$ of $M_v(k)$; carrying out a respectively $N_b$ bits quantization to the real part and imaginary part of every element in V(k) by $M_v^{lin}(k)$, and obtaining the quantized beamforming matrix $V^q(k)$; $N_b$ is positive integer; transmitting said quantization amplitude $M_v(k)$ and said quantized beamforming matrix $V^q(k)$.

10 Claims, 6 Drawing Sheets

METHOD AND APPARATUS FOR TRANSMITTING AND RECEIVING BEAMFORMING MATRIX

CROSS-REFERENCE TO RELATED APPLICATION

Related Applications

This application claims the benefit of Chinese patent application No. 201210025585.3 filed on Feb. 6, 2012 and titled "METHOD AND APPARATUS FOR TRANSMITTING AND RECEIVING BEAMFORMING MATRIX", which is incorporated herein by reference in its entirety.

This application claims the benefit of Chinese patent application No. 201210052998.0 filed on Mar. 2, 2012 and titled "METHOD AND APPARATUS FOR TRANSMITTING AND RECEIVING BEAMFORMING MATRIX", which is incorporated herein by reference in its entirety.

FIELD OF THE INVENTION

The present invention relates to the field of wireless communications, particularly relates to a method and apparatus for a quantized feedback of the beamforming matrix.

BACKGROUND OF THE INVENTION

In MIMO system, the access point and the user site adopt the mode of spatial multiplexing and employ multiple antennas to obtain higher rate. Comparing to the general spatial multiplexing method, an enhanced technique is that the user site feeds back channel information to the access point, the access point uses certain pre-coding technique based on the obtained channel information, thereby improves the transmission performance.

The MIMO system obtains the channel information in several ways. IEEE 802.11n proposed a quantitative feedback beamforming matrix solution, the access point initiates a feedback request, the user site feeds back quantized beamforming matrix of the subcarriers on MIMO channel (also known as v matrix), the access point thus calculates the pre-coding matrix $Q_k$.

For ease of describing the quantized feedback process of the V matrix, hereinafter a user site may be referred to as a transmitter, and the access point may be referred to as a receiver. The specific method of quantized feedback is shown in FIG. 1.

Step S101: the transmitter calculates the maximum value of the real part and imaginary part of the elements in subcarrier's beamforming matrix:

$$m_v(k) = \max \begin{cases} \max\{|\text{Re}(v_{(m,l)}(k))|_{m=1,l=1}^{m=N_r,l=N_c}\}, \\ \max\{|\text{Im}(v_{(m,l)}(k))|_{m=1,l=1}^{m=N_r,l=N_c}\} \end{cases}; \quad (1)$$

wherein $v_{(m,l)}(k)$ represents the elements in v(k), $\text{Re}(v_{(m,l)}(k))$ represents the real part of $v_{(m,l)}(k)$, $\text{Im}(v_{(m,l)}(k))$ represents the imaginary part of $v_{(m,l)}(k)$; m is the row position reference, l is the column position reference, $N_r$ is the maximum row number, $N_c$ is the maximum column number, $1 \leq m \leq N_r$, $1 \leq l \leq N_c$, $N_r \geq 1$, $N_c \geq 1$, m, l, $N_r$ and $N_c$ are all positive integer, k is the subcarrier's position reference, which may be a serial number.

Step S102: said transmitter carries out a 3 bits quantization to the relative value $$\frac{\max\{m_v(z)\}_{z=-N_{SR}}^{z=N_{SR}}}{m_v(k)}$$

of $m_v(k)$, to obtain the quantized result $M_v(k)$:

$$M_v(k) = \min\left\{7, \left\lfloor 20\log_{10}\left(\frac{\max\{m_v(z)\}_{z=-N_{SR}}^{z=N_{SR}}}{M_v(k)}\right)\right\rfloor\right\}; \quad (2)$$

wherein $$\max\{m_v(z)\}_{z=-N_{SR}}^{z=N_{SR}}$$

is the maximum amplitude value Alpha, $\lfloor x \rfloor$ represents the maximum integer not exceeding x, NSR is the subscript of the maximum data subcarrier.

Step S103: said transmitter calculates the linear part $M_v^{lin}(k)$ of $M_v(k)$:

$$M_v^{lin}(k) = \frac{\max\{m_v(z)\}_{z=-N_{SR}}^{z=N_{SR}}}{10^{M_v(k)/20}}. \quad (3)$$

Step S104: said transmitter carries out respectively Nb bits quantization to the real part and the imaginary part of every element in matrix V(k):

$$v_{(m,l)}^{q(R)} = \text{round}\left(\frac{\text{Re}(v_{(m,l)}(k))}{M_v^{lin}(k)}(2^{N_b-1} - 1)\right) \quad (4)$$

$$v_{(m,l)}^{q(I)} = \text{round}\left(\frac{\text{Im}(v_{(m,l)}(k))}{M_v^{lin}(k)}(2^{N_b-1} - 1)\right). \quad (5)$$

Step S105: said transmitter feeds back Alpha, $M_v(k)$ and the quantized beamforming matrix $V^q(k)$ to the receiver.

Step S106: said receiver receives Alpha, $M_v(k)$ and $V^q(k)$.

Step S107: said receiver calculates the linear value according to $M_v(k)$:

$$r(k) = 10^{M_v(k)/20} \quad (6).$$

Step S108: said receiver carries out a zooming of the real part $v_{(m,l)}^{q(R)}(k)$ and the imaginary part $v_{(m,l)}^{q(I)}(k)$ of the elements $v_{(m,l)}^q(k)$ in matrix $V^q(k)$, to recover the beamforming matrix:

$$\text{Re}\{\tilde{v}_{(m,l)}(k)\} = \frac{\max\{m_v(z)\}_{z=-N_{SR}}^{z=N_{SR}} v_{(m,l)}^{q(R)}(k)}{r(k)(2^{N_b-1} - 1)} \quad (7)$$

$$\text{Im}\{\tilde{v}_{(m,l)}(k)\} = \frac{\max\{m_v(z)\}_{z=-N_{SR}}^{z=N_{SR}} v_{(m,l)}^{q(I)}(k)}{r(k)(2^{N_b-1} - 1)}.$$

According to the receiver's decoding process (Equation 7) of the quantized v matrix, the receiver gets that, the feedback overhead needed in the v matrix quantization feedback is the sum of the bit number of Alpha, $M_v(k)$ and $v^q(k)$: $N_{Alpha}+3+2 \times N_b \times N_r \times N_c$

SUMMARY OF THE INVENTION

The technical problem to be solved in the present disclosure is, to provide a method and apparatus for transmitting and receiving beamforming matrix, and intend to provide a new beamforming matrix quantization feedback scheme. Embodiments consistent with the present disclosure ensure the performance of quantitative feedback and reduce the complexity and feedback overhead.

One aspect of the present disclosure provides a method for transmitting the beamforming matrix, comprising: calculating the maximum value $m_v(k)$ of the real part and imaginary part of the elements in subcarrier's beamforming matrix; carrying out a M bits quantization to $m_v(k)$ and obtaining the quantization amplitude $M_v(k)$, M is positive integer; calculating the linear part $M_v^{lin}(k)$ of $M_v(k)$; carrying out a respectively $N_b$ bits quantization to the real part and imaginary part of every element in V(k) by $M_v^{lin}(k)$, and obtaining the quantized beamforming matrix $V^q(k)$; $N_b$ is positive integer; and transmitting said quantization amplitude $M_v(k)$ and said quantized beamforming matrix $V^q(k)$.

Another aspect of the present disclosure provides a method for receiving beamforming matrix, comprising: receiving the quantized subcarrier's beamforming matrix $V^q(k)$ and the quantization amplitude $M_v(k)$; recovering the amplitude value r(k) according to $M_v(k)$; zooming to the real part and the imaginary part of every element in $V^q(k)$ according to r(k), to recover the beamforming matrix $\tilde{v}(k)$ of the subcarrier.

Another aspect of the present disclosure further provides an apparatus for transmitting beamforming matrix, comprising: a first operation module, configured to calculate the maximum value $m_v(k)$ of the real part and imaginary part of the elements in subcarrier's beamforming matrix; a first quantization module, configured to carry out a M bits quantization to $m_v(k)$ and obtain the quantization amplitude $M_v(k)$; a second operation module, configured to calculate the linear part $M_v^{lin}(k)$ of $M_v(k)$; a second quantization module, configured to carry out a respectively $N^b$ bits quantization to the real part and imaginary part of every element in V(k) by $M_v^{lin}(k)$, and obtain the quantized beamforming matrix $V^q(k)$; $N^b$ is positive integer; and a transmitting module, configured to transmit said quantization amplitude $M_v(k)$ and said quantized beamforming matrix $V^q(k)$.

Another aspect of the present disclosure further provides an apparatus for receiving beamforming matrix, comprising: a receiving module, configured to receive quantized beamforming matrix $V^q(k)$ of the subcarrier, which has been quantized by the above quantization method and transmitted, and the quantization amplitude $M_v(k)$; a first processing module, configured to recover the amplitude value r(k) according to $M_v(k)$; a second processing module, configured to zoom to the real part and the imaginary part of every element in $V^q(k)$ according to r(k), to recover the beamforming matrix $\tilde{V}(k)$ of the subcarriers.

The present disclosure provides a method and apparatus for transmitting and receiving beamforming matrix, and provides a new beamforming matrix quantization feedback scheme. Embodiments consistent with the present disclosure ensure the performance of quantitative feedback, reduce the algorithm complexity and feedback overhead.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

The First Embodiment

After research and experimentation, an embodiment consistent with the present disclosure provides a new method for quantized feedback of the beamforming matrix. Below the embodiment is described in details from the transmitting side and the receiving side.

Figure 1:
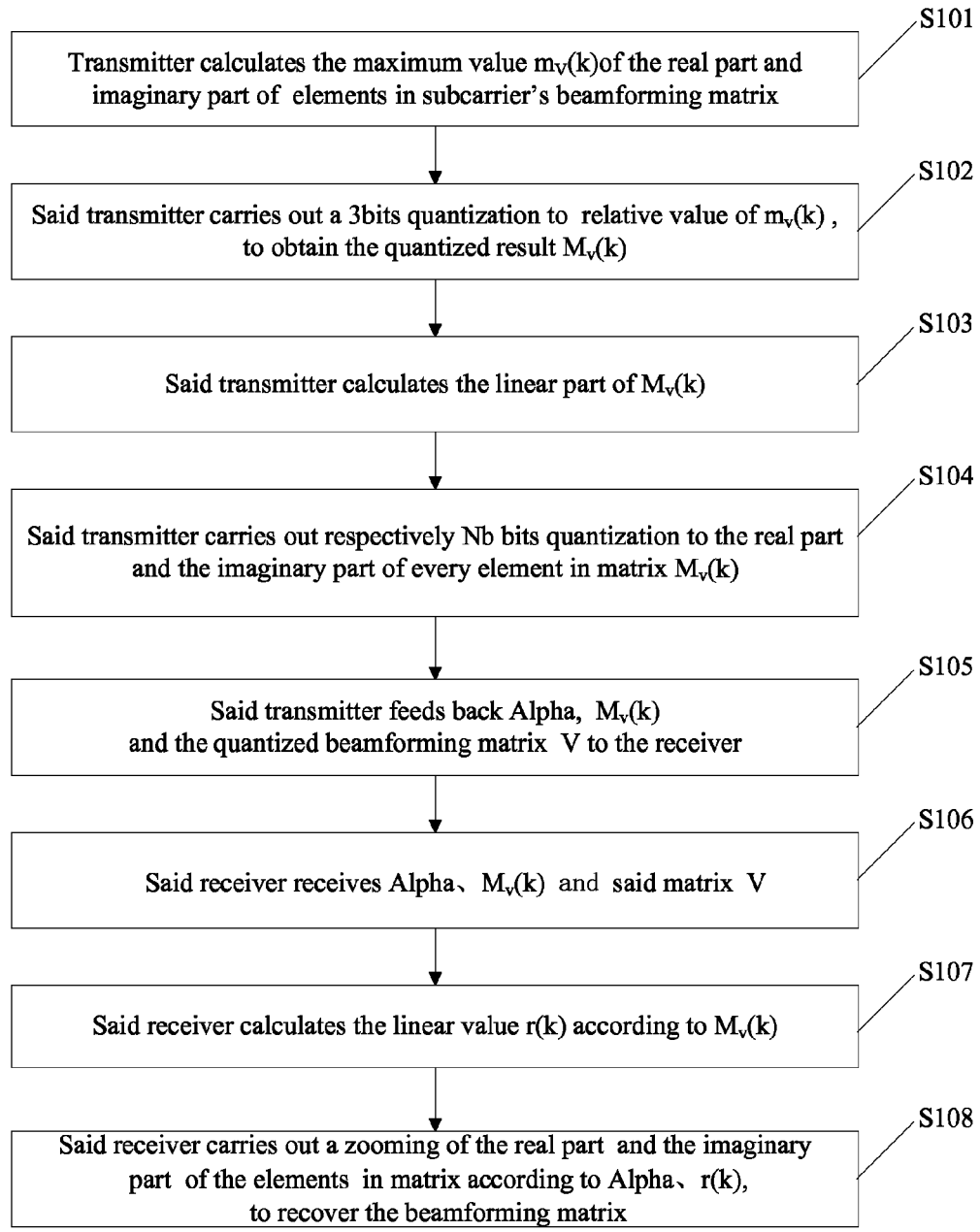
FIG. 1 is the flowchart of the method for quantized feedback of the beamforming matrix defined in 802.11.
Figure 2:
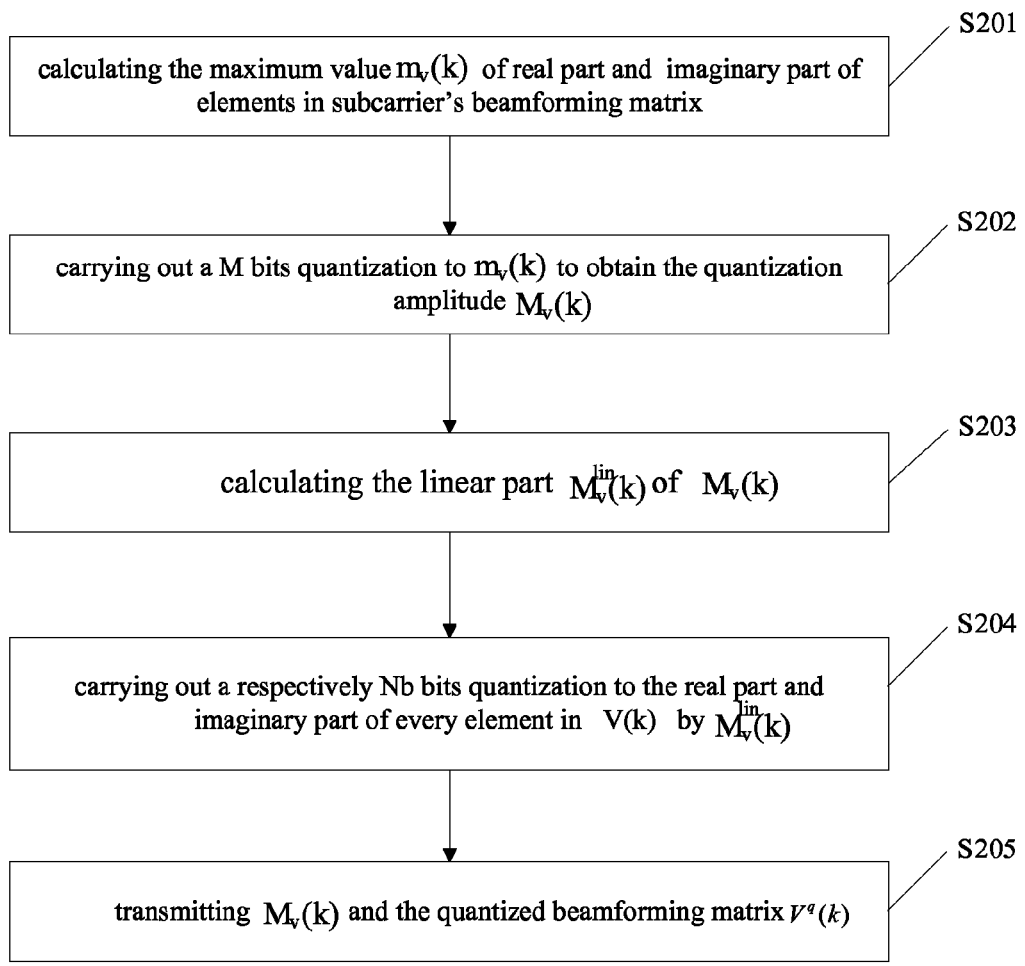
FIG. 2 is the flowchart of the method for transmitting the beamforming matrix in the first embodiment of the present disclosure.

FIG. 2 illustrates a method for transmitting the beamforming matrix in the first embodiment of the prevent disclosure. The method includes the following steps.

Step S201: calculating the maximum value $m_v(k)$ of the real part and the imaginary part of the elements in subcarrier's beamforming matrix. Specifically, it could be achieved by the following equation:

$$m_v(k) = \max \left\{ \begin{array}{l} \max\{|\text{Re}(v_{(m,l)}(k))|_{m=1,l=1}^{m=N_r,l=N_c}\}, \\ \max\{|\text{Im}(v_{(m,l)}(k))|_{m=1,l=1}^{m=N_r,l=N_c}\} \end{array} \right\} \quad (8)$$

wherein $v_{(m,l)}(k)$ represents the element in v(k), $Re(v_{(m,l)}(k))$ represents the real part of $v_{(m,l)}(k)$, $Im(v_{(m,l)}(k))$ represents the imaginary part of $v_{(m,l)}(k)$; m is the row position reference, l is the column position reference, $N_r$ is the maximum row number, $N_c$ is the maximum column number, $1 \leq m \leq N_r$, $1 \leq l \leq N_c$, $N_r \geq 1$, $N_c \geq 1$, m, l, $N_r$ and $N_c$ are all positive integer, k is the subcarrier's position reference, Specifically formed as number.

V(k), of which the row number is $N_r$, and the column number is $N_c$, is obtained after the user site's carrying out the channel estimation based on the feedback request of the beamforming matrix, and the SVD decomposition to the obtained channel state information matrix (also called H-matrix). $N_r$ is equal to the number of transmit antennas of the access point (AP), and is obtained by the user site in the process of consultation of the capacity with the access point; $N_c$ is equal to the number of spatial streams, it could be set by STA as required, generally the number of spatial streams is less than the minimum value of the number of the transmit antennas of CAP and the number of receive antennas of STA.

Step S202: carrying out an M bits quantization to $m_v(k)$ to obtain the quantization amplitude $M_v(k)$. Specifically, it could be achieved by the following equation:

$$M_v(k) = \min\{2^M - 1, f(g(m_v(k)))\} \quad (9);$$

wherein $f(g(m_v(k)))$ is the function, which maps the linear $m_v(k)$ to the logarithmic interval. $f(g(m_v(k)))$ represents the integral function of the result of $g(m_v(k))$. Said integral function could be rounding up (represented by "⌈ ⌉"), rounding down (represented by "⌊ ⌋") or the rounding operation.

$M_v(k)$ is configured to obtain the minimum value of $(2^M - 1)$ and $f(g(m_v(k)))$, thus to limit the quantized result, to ensure the accuracy of the quantization. M represents the quantization bit number, which is positive integer. Wherein, M could be a positive integer greater than or equal to 2. Considering the performance and cost, optionally, in an embodiment of the disclosure M=3 is selected.

Optionally, $g(m_v(k)) = \max(0, a \cdot \log_b(m_v(k) + c))$ is employed, wherein, a, b, c are all positive real number. Optionally, a=14.42, b=2, c=0.45 is selected, thus to obtain better performance of the quantization feedback of the beamforming matrix. Optionally, a=47.9, b=10, c=0.45 is selected, which could also obtain better performance of the quantization feedback of the beamforming matrix.

Step S203: calculating the linear part $M_v^{lin}(k)$ of $M_v(k)$. Specifically, it could be achieved by the following equation:

$$M_v^{lin}(k) = b^{M_v(k)/a} \quad (10)$$

Step S204: carrying out a respectively $N_b$ bits quantization to the real part and imaginary part of every element in V(k) by $M_v^{lin}(k)$. Specifically, it could be achieved by the following equation:

$$V_{(m,l)}^{q(R)} = \text{sign}(V_{(m,l)}(k)) * \min\left(2^{N_b - 1} - 1, \text{round}\left(\frac{|Re(V_{(m,l)}(k))|}{M_v^{lin}(k) - c}(2^{N_b - 1} - 1)\right)\right)$$

$$V_{(m,l)}^{q(I)} = \text{sign}(V_{(m,l)}(k)) *$$
$$\min\left(2^{N_b - 1} - 1, \text{round}\left(\frac{|Im(V_{(m,l)}(k))|}{M_v^{lin}(k) - c}(2^{N_b - 1} - 1)\right)\right); \quad (11)$$

wherein, $v_{(m,l)}(k)$ represents the element in v(k), $V_{(m,l)}^{q(R)}$ represents the real part of quantized $v_{(m,l)}(k)$, $V_{(m,l)}^{q(I)}$ represents the imaginary part of quantized $v_{(m,l)}(k)$; m is the row position reference, l is the column position reference, $\text{sign}(V_{(m,l)}(k))$ represents the polarity symbols of $V_{(m,l)}(k)$;

$$\min\left(2^{N_b - 1} - 1, \text{round}\left(\frac{|Re(V_{(m,l)}(k))|}{M_v^{lin}(k) - c}(2^{N_b - 1} - 1)\right)\right)$$

represents the minimum value of $(2^{N_b - 1} - 1)$ and $$\text{round}\left(\frac{|Re(V_{(m,l)}(k))|}{M_v^{lin}(k) - c}(2^{N_b - 1} - 1)\right);$$

round represents the rounding operation; "| |" represents the absolute operation; $N^b$ is positive integer.

By obtaining the minimum value of $(2^{N_b - 1} - 1)$ and $$\text{round}\left(\frac{|Re(V_{(m,l)}(k))|}{M_v^{lin}(k) - c}(2^{N_b - 1} - 1)\right),$$

the amplitude of the quantized result is limited, to ensure the accuracy of the quantization. Considering the absolute operation is carried out during the quantization, the recovering of the symbols' polarity (which is the symbol's positive sign or negative sign) is needed, which is to multiple $\text{sign}(V_{(m,l)}(k))$.

$N^b$ is calculated by the user site based on the quantized overhead, which is calculated by the resource allocation information and feedback MCS level carried in the feedback request of the beamforming matrix. $N_b$ is a positive integer, and some optional values are provided hereinafter: 4, 5, 6, 8, 10, 12, which could be selected based on different requirements of the quantization accuracy specifically.

Step S205: transmitting $M_v(k)$ the quantized beamforming matrix $V^q(k)$. Optionally, when feeding back the beamforming matrix, the transmitter could take the subcarrier set, which needs the quantized feedback, as unit, and transmit together the quantized beamforming matrix and $M_v(k)$ of the subcarriers in said set. Said subcarrier set, which need the quantized feedback, is indicated when the access point initiates a feedback request of the beamforming matrix.

Figure 3:
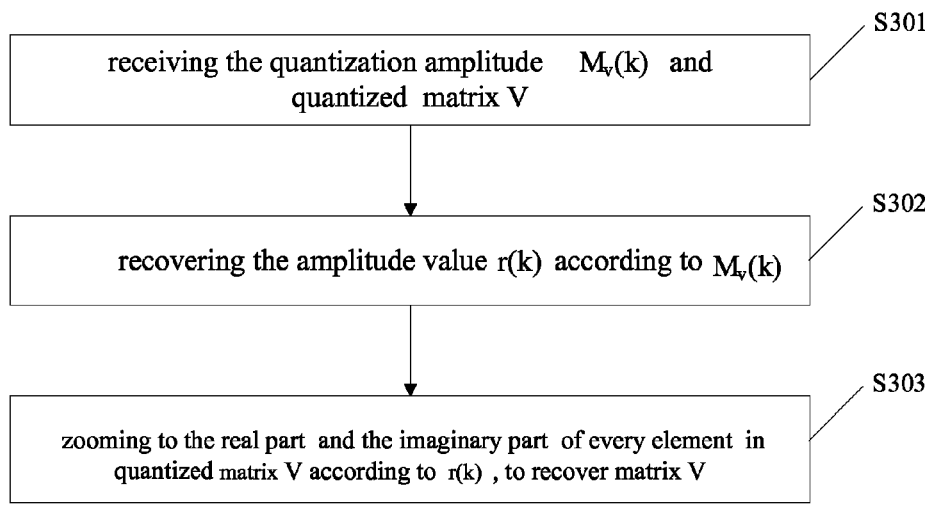
FIG. 3 is the flowchart of the method for receiving the beamforming matrix in the first embodiment of the present disclosure.

Accordingly, another embodiment of the present disclosure further provides a method for receiving the beamforming matrix, recovers the beamforming matrix by carrying out a reverse process to the quantized beamforming matrix $V^q(k)$, illustrated in FIG. 3, comprising the following steps.

Step S301: receiving the quantization amplitude $M_v(k)$ and quantized subcarrier's beamforming matrix $V^q(k)$.

Step S302: recovering the amplitude value r(k) according to $M_v(k)$. Specifically, carrying out a reverse process based on the method for quantizing $M_v(k)$, and recovering r(k). For example, when $M_v(k)$ is quantizing by $M_v(k) = \min\{2^M - 1, f(g(m_v(k)))\}$, it could employ the following equation to calculate r(k):

$$r(k) = g^{-1}(M_v(k)) = b^{M_v(k)/a} - c \quad (12)$$

wherein, $g^{-1}(M_v(k))$ is the inverse function of $g(m_v(k))$; a, b, c are all positive real numbers; $g(m_v(k))$ and its inverse function $g^{-1}(M_v(k))$ are pre-negotiated by the transmitter and receiver, and stored in the local respectively.

Step S303: zooming to the real part $V_{(m,l)}^{q(R)}(k)$ and the imaginary part $v_{(m,l)}^{q(I)}(k)$ of every element $v_{(m,l)}^q(k)$ in $V^q(k)$ according to r(k), to recover the beamforming matrix $\tilde{v}(k)$ of said subcarrier. Specially, it could be achieved by the following equation:

$$\text{Re}(\tilde{V}_{(m,l)}(k)) = \frac{r(k)V_{(m,l)}^{q(R)}(k)}{(2^{N_b-1}-1)} \quad (13)$$

$$\text{Im}(\tilde{V}_{(m,l)}(k)) = \frac{r(k)V_{(m,l)}^{q(I)}(k)}{(2^{N_b-1}-1)}$$

We found the following after comparing the first embodiment of the disclosure and the scheme of 802.11.

Regarding the complexity of the algorithm realization: in contrast to the calculation of $M_v(k)$ and its linear value both need the division to $m_v(k)$ in the scheme of 802.11, the technical solution in the present disclosure has low algorithm complexity and less computation.

Regarding the feedback overhead: according to the feedback coding process (S201~S205) of the beamforming matrix of the above transmitter in the prevent disclosure, it shows that, the feedback overhead needed in the mode of quantized feedback of the beamforming matrix is the sum of the needed bit number of $M_v(k)$ and quantized beamforming matrix $V^q(k)$: $M+2 \times N_b \times N_r \times N_c$, the overhead is $N_{Alpha}$ less than the scheme defined in 802.11. Referred to table 1 specifically, comparing the feedback overhead between the scheme of 802.11 and the scheme of the first embodiment in the present disclosure, as both of them carry out the quantization to the real part and the imaginary part, they use the same quantization bit number Nb, however, the scheme of the first embodiment doesn't need to feedback the value of Alpha. Therefore, the first embodiment of the present disclosure costs less feedback overhead.

| a. Table 1 feedback overhead | |
|---|---|
| i. feedback overhead | |
| IEEE 802.11n | $B_{feedback} = N_{feedback}$ (scaleB + $N_{tx}N_{rx}$ (realB + imagB) + $N_{Alpha}$) <br> scaleB = M (bits) <br> realB = imagB = $N_b$ (bits) |
| first embodiment in the present disclosure | $B_{feedback} = N_{feedback} \cdot$ (scaleB + $N_{tx}N_{rx}$ (realB + imagB)) <br> scaleB = M (bits) <br> realB = imagB = $N_b$ (bits) | wherein, $B_{feedback}$ is the feedback overhead, $N_{feedback}$ is the number of the elements in the feedback subcarrier set $\Omega_{feedback}$, scaleB is the quantization bit of $M_H(k)$, $N_{tx}$ is the number of CAP transmit antennas, $N_{rx}$ is the number of STA receive antennas, realB is the quantization accuracy of the real part; imagB is the quantization accuracy of the imaginary part.

Figure 4:
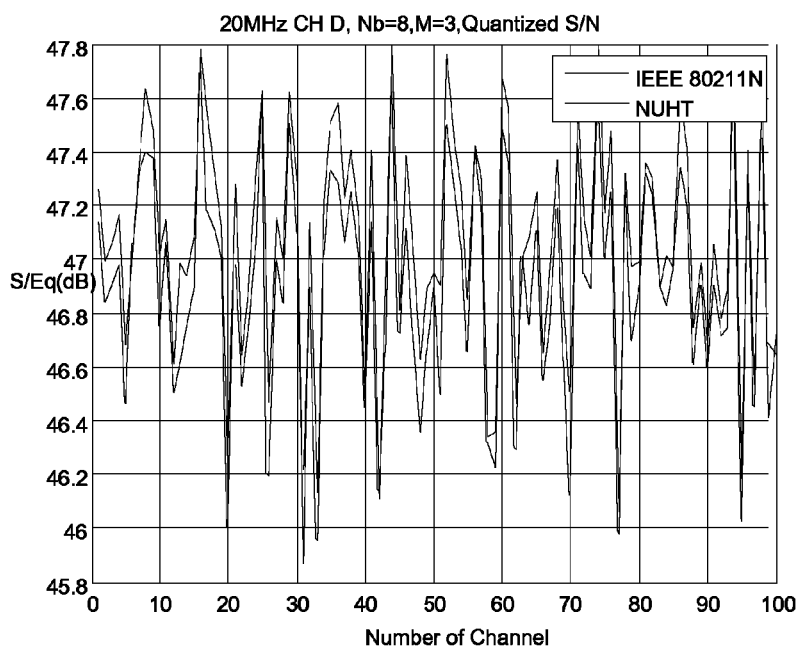
FIG. 4 illustrates the SNR comparison result of between the method for the quantized feedback of the beamforming matrix in the first embodiment of the present disclosure and the method for quantized feedback of the beamforming matrix defined in 802.11 on channel D, the bandwidth of which is 20 MHz.

On the feedback performance, the first embodiment in the present disclosure first selects $M_v(k)=\min\{2^M-1, \text{round}(47.9\cdot\lg(m_v(k)+0.45)\}$, a=47.9, b=10, c=0.45, $N_b=8$, M=3, comparing the quantization SNR of the quantization algorithm of the beamforming matrix provided by the first embodiment in the present disclosure and IEEE802.11, the result of their quantization SNR when both of them are on channel D, the bandwidth of which is 20 MHz, is illustrated in FIG. 4, as seen from the figure, both of them have the same or similar performance.

Figure 5:
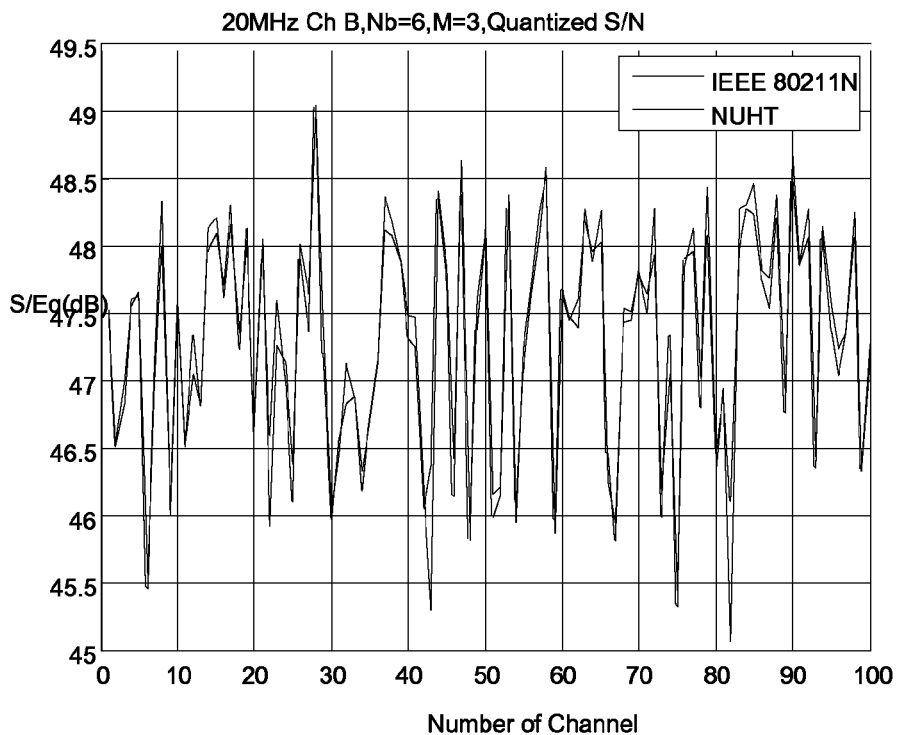
FIG. 5 illustrates the SNR comparison result of the above two after the adjustment of $N^b=6$ on the basis of FIG. 4.
Figure 6:
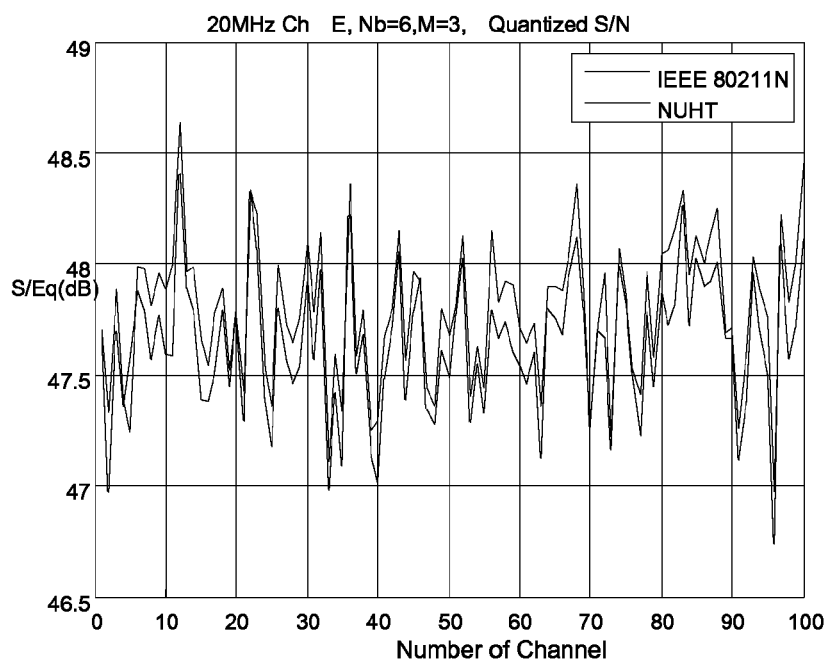
FIG. 6 illustrates the SNR comparison result with the same quantization parameters as FIG. 5 on channel E.

Adjust the value of the parameter $N_b$ in the scheme of the first embodiment in the present disclosure, while keeping the other parameters the same; select $M_v(k)=\min\{2^M-1, \text{round}(47.9\cdot\lg(m_v(k)+0.45)\}$, a=47.9, b=10, c=0.45, $N_b=6$, M=3, when both of them are on 20 MHz channel B the comparing result is illustrated in FIG. 5, as seen from the figure, both of them still have the same or similar performance. Keep the parameters unchanged, which is, select $M_v(k)=\min\{2^M-1, \text{round}(47.9\cdot\lg(m_v(k)+0.45)\}$, a=47.9, b=10, c=0.45, $N_b=6$, M=3, check the comparing result when they are on the 20 MHz channel E, as illustrated in FIG. 6, both of them still keep the same or similar performance.

Figure 7:
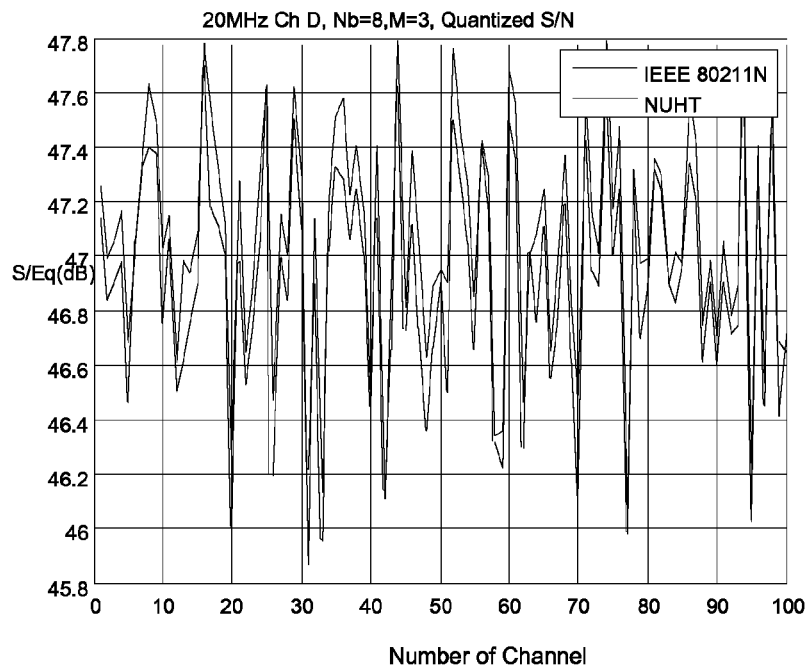
FIG. 7 illustrates the SNR comparison result of the above two after the adjustment of a=14.42, b=2 on the basis of FIG. 4.

Continue to adjust the value of the parameter a, b of the scheme of the first embodiment in the present disclosure, select $M_v(k)=\min\{2^M-1, \text{round}(14.42\cdot\log_2(m_v(k)+0.45)\}$, a=14.42, b=2, c=0.45, $N_b=8$, M=3, the comparing result when they are both on the 20 MHz channel D is illustrated in FIG. 7. As shown in FIG. 7, both of them still keep the same or similar performance.

After the recovery of $\tilde{v}(k)$, the receiver could calculate the subcarrier's precoding matrix $Q_k$ according to $\tilde{v}(k)$. Because the performance of the recovery of $\tilde{v}(k)$ in the above scheme of the first embodiment in the present disclosure and IEEE802.11 is similar, therefore, $Q_k$ could be obtained in high accuracy.

Figure 8:
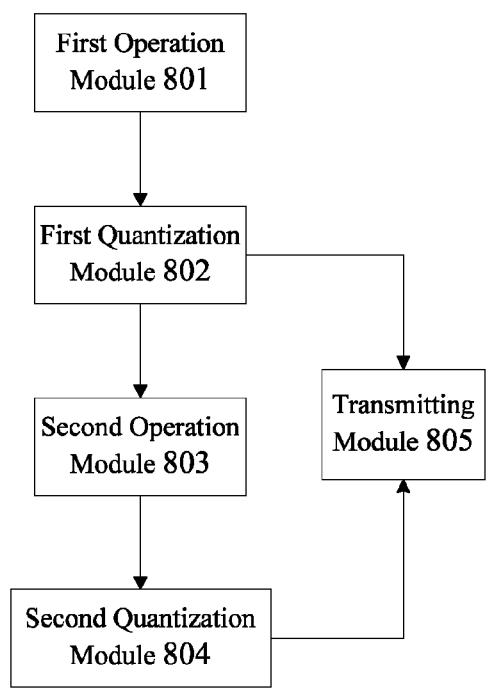
FIG. 8 illustrates the apparatus for transmitting the beamforming matrix in the embodiment of the present disclosure.

Another embodiment in the present invention provides an apparatus for transmitting the beamforming matrix, as illustrated in FIG. 8, include the following components. A first operation module 801, configured to calculate the maximum value $m_v(k)$ of the real part and imaginary part of the elements in subcarrier's beamforming matrix. A first quantization module 802, configured to carry out an M bits quantization to $m_v(k)$ and obtain the quantization amplitude $M_v(k)$. A second operation module 803, configured to calculate the linear part $M_v^{lin}(k)$ of $M_v(k)$. A second quantization module 804, configured to carry out a respectively $N_b$ bits quantization to the real part and imaginary part of every element in V(k) by $M_v^{lin}(k)$, and obtain the quantized beamforming matrix $V^q(k)$; $N_b$ is positive integer. A transmitting module 805, configured to transmit said quantization amplitude $M_v(k)$ and said quantized beamforming matrix $V^q(k)$.

Optionally, said first quantization module 802, configured to carry out a M bits quantization to $m_H(k)$ according to $M_v(k)=\min\{2^M-1, f(g(m_v(k)))\}$; wherein, $M_v(k)$ is configured to obtain the minimum value of $(2^M-1)$ and $f(g(m_v(k)))$; the function $f(g(m_v(k)))$ represents the integral function of the result of $g(m_v(k))$; $g(m_v(k))$ is configured to map the linear $m_v(k)$ to the interval which is represented from natural number to logarithm, M is positive integer.

Optionally, $g(m_v(k))=a\cdot\log_b(m_v(k)+c)$, a, b, c are all positive real numbers.

Optionally, said second operation module 803 calculates the linear part $M_v^{lin}(k)$ of $M_v(k)$ according to the equation $M_v^{lin}(k)=b^{M_v(k)/a}$.

Optionally, said integer operation could be rounding up, rounding down or the rounding operation.

Optionally, M is greater than or equal to 2.

Optionally, M could be equal to 3.

Optionally, a=14.42, b=2, c=0.45 could be selected.

Optionally, a=47.9, b=10, c=0.45 could be selected.

Optionally, said second quantization module 804, it could be achieved by the following equation:

$$V_{(m,l)}^{q(R)} = \text{sign}(V_{(m,l)}(k))*\min\left(2^{N_b-1}-1, \text{round}\left(\frac{|\text{Re}(V_{(m,l)}(k))|}{M_v^{lin}(k)-c}(2^{N_b-1}-1)\right)\right);$$

$$V_{(m,l)}^{q(I)} = \text{sign}(V_{(m,l)}(k))*\min\left(2^{N_b-1}-1, \text{round}\left(\frac{|\text{Im}(V_{(m,l)}(k))|}{M_v^{lin}(k)-c}(2^{N_b-1}-1)\right)\right);$$

Carrying out a respectively $N_b$ bits quantization to the real part and the imaginary part of each element in V(k); $V_{(m,l)}(k)$ represents the element in V(k), $V_{(m,l)}^{q(R)}$ represents the real part of quantized $V_{(m,l)}(k)$, $V_{(m,l)}^{q(I)}$ represents the imaginary part of quantized $V_{(m,l)}(k)$; m is the row position reference, l is the column position reference, $\text{sign}(V_{(m,l)}(k))$ represents the polarity symbols of $V_{(m,l)}(k)$;

$$\min\left(2^{N_b-1}-1, \text{round}\left(\frac{|\text{Re}(V_{(m,l)}(k))|}{M_v^{lin}(k)-c}(2^{N_b-1}-1)\right)\right)$$

represents the minimum of $(2^{N_b-1}-1)$ and $$\text{round}\left(\frac{|\text{Re}(V_{(m,l)}(k))|}{M_v^{lin}(k)-c}(2^{N_b-1}-1)\right);$$

round represents the rounding operation; "| |" represents the absolute operation; $N_b$ is positive integer.

Optionally, the value of $N_b$ could be one of 4, 5, 6, 8, 10, 12.

Optionally, said transmitting module 805, is configured to transmit together the quantization amplitude $M_v(k)$ of each subcarrier in the set of the subcarriers, which need the feedback and the quantized V matrix.

Figure 9:
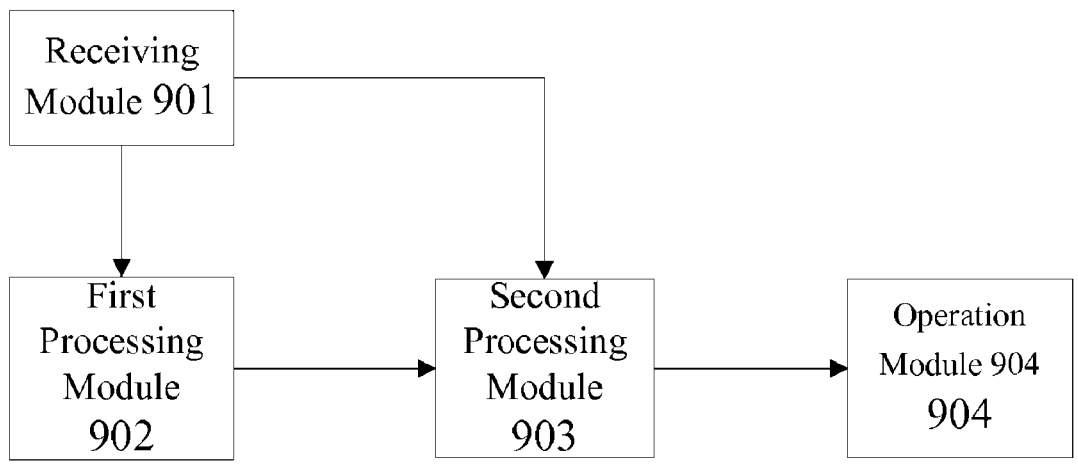
FIG. 9 illustrates the apparatus for receiving the beamforming matrix in the embodiment of the present disclosure.

Another embodiment in the present disclosure provides an apparatus for receiving the beamforming matrix, as illustrated in FIG. 9, including the following components. A receiving module 901, configured to receive quantized beamforming matrix $V_q(k)$ of the subcarrier, which has been quantized by the above quantization method and transmitted, and the quantization amplitude $M_v(k)$. A first processing module 902, configured to recover the amplitude value $r(k)$ according to $M_v(k)$. A second processing module 903, configured to zoom to the real part and the imaginary part of every element in $V^q(k)$ according to $r(k)$, to recover the beamforming matrix $\tilde{V}(k)$ of the subcarriers. Optionally, said first processing module 902, configured to carry out a reverse process based on the method of quantizing $M_v(k)$, and recover the amplitude value $r(k)$.

For example, when is $M_v(k)$ quantizing by employing $M_v(k)=\min\{2^M-1, f(g(m_v(k)))\}$, the following equation (12) could be employed to calculate $r(k)$.

Optionally, said second processing module 903, is configured to zoom the real part and the imaginary part of every element in $v^q(k)$ according to $$\text{Re}(\tilde{V}_{(m,l)}(k)) = \frac{r(k)V_{(m,l)}^{q(R)}(k)}{(2^{N_b-1}-1)}$$

$$\text{Im}(\tilde{V}_{(m,l)}(k)) = \frac{r(k)V_{(m,l)}^{q(I)}(k)}{(2^{N_b-1}-1)};$$

wherein, $\tilde{v}_{(m,l)}(k)$ represents the element in $\tilde{v}(k)$, $\text{Re}(\tilde{v}_{(m,l)}(k))$ represents the real part of quantized $\tilde{v}_{(m,l)}(k)$, $\text{Im}(\tilde{v}_{(m,l)}(k))$ represents the imaginary part of quantized $\tilde{v}_{(m,l)}(k)$; $V_{(m,l)}^q(k)$ represents the element in $V^q(k)$; $V_{(m,l)}^{q(R)}(k)$ represents the real part of $V_{(m,l)}^q(k)$; $V_{(m,l)}^{q(I)}(k)$ represents the imaginary part of $V_{(m,l)}^q(k)$; m is the row position reference, l is the column position reference, the quantization bit $N_b$ is positive integer.

Optionally, said apparatus for receiving the beamforming matrix could comprise an operation module 904, configured to calculate the subcarrier's precoding matrix $Q_k$ according to $\tilde{v}(k)$.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for transmitting a beamforming matrix of a subcarrier on a channel of a Multiple Input Multiple Output (MIMO) channel of a MIMO system by a transmitter in response to a feedback request from a receiver for obtaining channel information in the MIMO system, comprising:
   determining, by the transmitter, a maximum value $m_v(k)$ of a real part and an imaginary part of elements in a subcarrier's beamforming matrix $V(k)$;
   determining, by the transmitter, an M bits quantization of $m_v(k)$;
   determining, by the transmitter, a quantization amplitude $M_v(k)$, M being a positive integer, wherein no division calculation is performed on $m_v(k)$ to determine $M_v(k)$;
   determining, by the transmitter, a linear part $M_v^{lin}(k)$ of $M_v(k)$, wherein no division calculation is performed on $m_v(k)$ to determine the linear part $M_v^{lin}(k)$ of $M_v(k)$;
   determining, by the transmitter, a $N_b$ bits quantization of a real part and imaginary part of every element in $V(k)$ by $M_v^{lin}(k)$;
   determining, by the transmitter, a quantized beamforming matrix $V^q(k)$, $N_b$ being a positive integer, wherein $$V_{(m,l)}^{q(R)} = \text{sign}(V_{(m,l)}(k)) * \min\left(2^{N_b-1}-1, \text{round}\left(\frac{|\text{Re}(V_{(m,l)}(k))|}{M_v^{lin}(k)-c}(2^{N_b-1}-1)\right)\right);$$

$$V_{(m,l)}^{q(I)} = \text{sign}(V_{(m,l)}(k)) * \min\left(2^{N_b-1}-1, \text{round}\left(\frac{|\text{Im}(V_{(m,l)}(k))|}{M_v^{lin}(k)-c}(2^{N_b-1}-1)\right)\right);$$

$V_{(m,l)}(k)$ representing an element in $V(k)$; $V_{(m,l)}^{q(R)}$ representing a real part of quantized $V_{(m,l)}(k)$; $V_{(m,l)}^{q(I)}$ representing an imaginary part of quantized $V_{(m,l)}(k)$; m being a row position reference, l being a column position reference; $\text{sign}(V_{(m,l)}(k))$ representing a polarity symbols of $V_{(m,l)}(k)$;

$\min(2^{N_b-1}-1,$ $$\text{round}\left(\frac{|\text{Re}(V_{(m,l)}(k))|}{M_v^{lin}(k)-c}(2^{N_b-1}-1)\right))$$

representing a minimum value of $(2^{N_b-1}-1)$ and $$\text{round}\left(\frac{|\text{Re}(V_{(m,l)}(k))|}{M_v^{lin}(k)-c}(2^{N_b-1}-1)\right);$$

round representing a rounding operation;
"| |" representing an absolute operation; and c being a positive real number; and
   transmitting, by the transmitter, said quantization amplitude $M_v(k)$ and said quantized beamforming matrix $V^q(k)$.

2. The method of claim 1, wherein the M bits quantization of $m_v(k)$ is determined as follows:

$$M_v(k)=\min\{2^M-1, f(g(m_v(k)))\};$$

$M_v(k)$ being a minimum value of $(2^M-1)$ and $f(g(m_v(k)))$; $f(g(m_v(k)))$ representing an integral function of a result of $g(m_v(k))$; $g(m_v(k))$ mapping a linear $m_v(k)$ from an interval of natural numbers to an interval of logarithmic numbers, M being a positive integer.

3. The method of claim 2, wherein $g(m_v(k)) = a \log_b(m_v(k)c)$, a, b, c being positive real numbers.

4. The method of claim 3, wherein the linear part $M_v^{lin}(k)$ of $M_v(k)$ is determined by an equation: $M_v^{lin}(k) = b^{M_v(k)/a}$.

5. The method of claim 3, wherein a equals to 14.42, b equals 2, c equals to 0.45; or a equals to 47.9, b equals to 10, c equals to 0.45.

6. The method of claim 1, wherein M is greater than 1.

7. The method of claim 6, wherein M is equal to 3.

8. The method of claim 1, wherein the value of $N_b$ is one of 4, 5, 6, 8, 10, or 12.

9. The method of claim 1, further comprising:

transmitting said quantization amplitude $M_v(k)$ of each subcarrier in a set of subcarriers and said quantized beamforming matrix $V^q(k)$ together.

10. A method for a receiver receiving a beamforming matrix of a subcarrier on a Multiple Input Multiple Output (MIMO) channel of a MIMO system from a transmitter to obtain channel information in the MIMO system when the receiver initiates a feedback request, comprising:

receiving, by the receiver, a quantized subcarrier's beamforming matrix $V^q(k)$ and a quantization amplitude $M_v(k)$, wherein $$V_{(m,l)}^{q(R)} = \text{sign}(V_{(m,l)}(k)) * \min\left(2^{N_b-1} - 1, \text{round}\left(\frac{|\text{Re}(V_{(m,l)}(k))|}{M_v^{lin}(k) - c}(2^{N_b-1} - 1)\right)\right);$$

$$V_{(m,l)}^{q(I)} = \text{sign}(V_{(m,l)}(k)) * \min\left(2^{N_b-1} - 1, \text{round}\left(\frac{|\text{Im}(V_{(m,l)}(k))|}{M_v^{lin}(k) - c}(2^{N_b-1} - 1)\right)\right);$$

$V_{(m,l)}(k)$ representing an element in $V(k)$; $V_{(m,l)}^{q(R)}$ representing a real part of quantized $V_{(m,l)}(k)$; $V_{(m,l)}^{q(I)}$ representing an imaginary part of quantized $V_{(m,l)}(k)$;

m being a row position reference, l being a column position reference;

$\text{sign}(V_{(m,l)}(k))$ representing a polarity symbols of $V_{(m,l)}(k)$;

$$\min\left(2^{N_b-1} - 1, \text{round}\left(\frac{|\text{Re}(V_{(m,l)}(k))|}{M_v^{lin}(k) - c}(2^{N_b-1} - 1)\right)\right)$$

representing a minimum value of $(2^{N_b-1} - 1)$ and $$\text{round}\left(\frac{|\text{Re}(V_{(m,l)}(k))|}{M_v^{lin}(k) - c}(2^{N_b-1} - 1)\right);$$

round representing a rounding operation; "| |" representing an absolute operation; $N_b$ being a positive integer and c being a positive real number;

recovering, by the receiver, an amplitude value r(k) according to $M_v(k)$, including carrying out a reverse process based on a method for quantizing $M_v(k)$, wherein no division calculation is performed on $m_v(k)$ for quantizing $M_v(k)$;

scaling, by the receiver, a real part and an imaginary part of every element in $V^q(k)$ according to r(k);

recovering, by the receiver, a beamforming matrix $\tilde{v}(k)$ of a subcarrier; and calculating, by the receiver, the subcarrier's precoding matrix $Q_k$ according to $\tilde{V}(k)$.

* * * * *